United States Patent Office 3,050,191
Patented Aug. 21, 1962

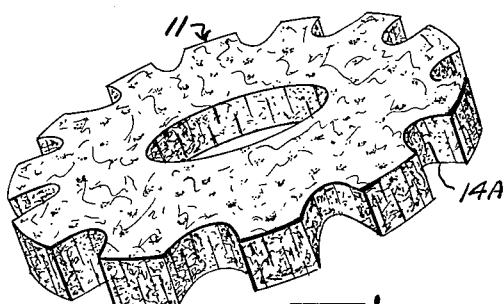
Fig. 1
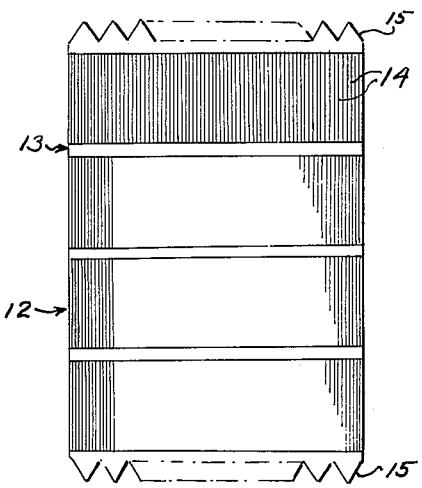
Fig. 2
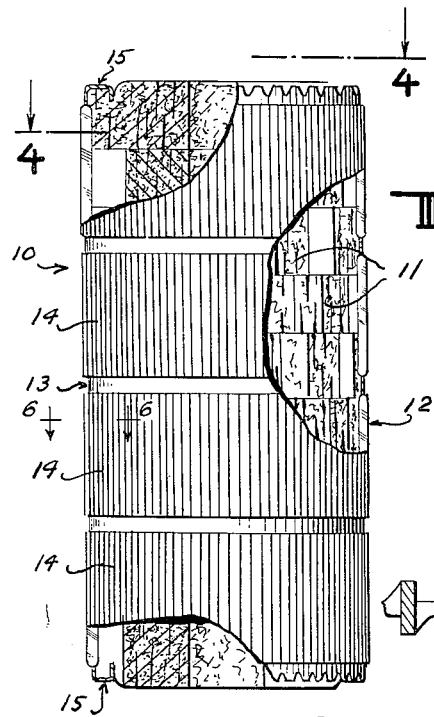
Fig. 3
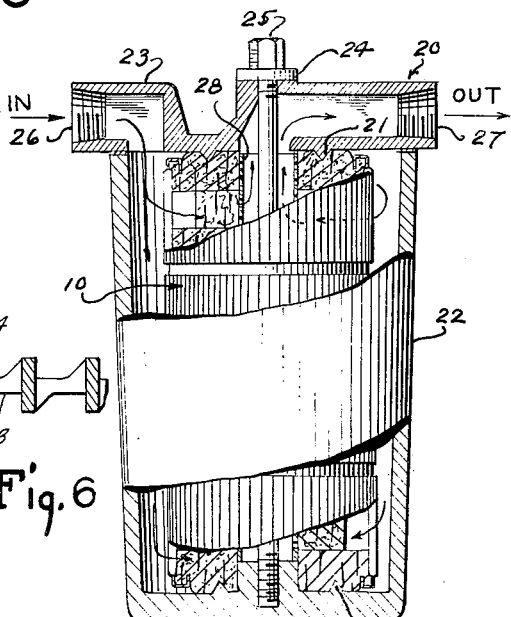
Fig. 5
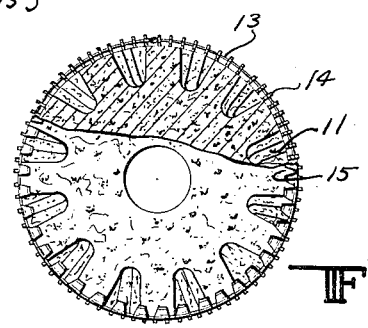
Fig. 4
Fig. 6
INVENTORS
THOMAS J. GILLICK, JR
HAROLD G. HENCKEN
ARTHUR C. WROTNOWSKI
BY
ATTORNEYS

3,050,191
FILTER CARTRIDGES
Thomas J. Gillick, Jr., Glenville, and Arthur C. Wrotnowski and Harold G. Hencken, Greenwich, Conn., assignors to American Felt Company, Glenville, Conn., a corporation of Massachusetts
Filed July 29, 1958, Ser. No. 751,679
2 Claims. (Cl. 210—485)

This invention relates to cartridges for cartridge type filters.

Many problems are involved in providing encased filter bodies which are adapted for used in cartridge type filters. The casing must be strong enough to hold a properly shaped filter body in an assembled or compacted state and yet the resulting cartridge must be adapted for easy insertion and removal from the container housing the filter element. Since the filter cartridge is often removed and discarded, the casing must serve its intended function and yet be relatively inexpensive. Heretofore, woven or knitted fabrics or metal containers provided with holes have been suggested for use as casings for filter bodies to be inserted in cartridge type filters. These casings have not proven completely satisfactory for, among other things, problems of plugging or "blinding" are normally encountered whereby the efficiency of the filtration is greatly imparied.

One of the objects of this invention is to provide a cartridge for filters which is simple in design, inexpensive, easily inserted and removed from the housing for the cartridge, and is highly efficient in use.

Another object of the invention is to provide a cartridge for cartridge filters which has greatly increased capacity and life.

A still further object of the invention is to provide a cartridge for cartridge filters provided with a covering which does not impair the efficiency of the filter body.

In one aspect of the invention, a filter body adapted for use in a cartridge type filter is encased in a metal or suitable material casing made from thin sheet material having a plurality of strips angularly disposed relative to the sheet from which the casing is made which thereby define slots in the sheet material. The strips preferably have a plurality of continuous supporting strips or bands at the ends thereof. Such a sheet material is readily formed by cutting a sheet of metal into a series of columns each composed of uniformly spaced parallel slits which preferably are separated from one another by intervening continuous metal strips. After the slits are cut, the metal strips separating the slits can be twisted along their longitudinal axes out of the plane of the sheet so as to become angularly disposed to the plane thereof, and thereby convert the slits into an equal number of slots defined by the strips of metal of material initially separating the slits and connecting the continuous metal strips lying between the columns of slits. When such a sheet material is wrapped around the walls of the body of the filter material of a shape designed for use in a cartridge filter, fastened on the sides, and turned in at the top and bottom of the material, the material is thereby held in an assembled and desired form and a filter cartridge is provided which may be readily inserted in, and removed from, a housing for the filter cartridge. If desired, the preformed sheet material may be folded over so as to enclose the top and bottom of the filter body as well as the sides thereof, the edges being serrated and impressed into the end material of the filter body.

In a particular aspect of the invention where the metal strips defining the slots in the sheet material are twisted out of the plane of the sheet from which it is made and are angularly disposed to this plane, the metal strips are thereby angularly disposed to the surface of the filter material encased in the metal sheet to form the filter cartridge and the filter material is in intimate contact only with the thin inner edges of the metal strips defining the slots in the sheet material. In this way, when a cartridge is inserted in an appropriate housing, a fluid containing solids gains substantially uninterrupted access to the filter body through the slots in the wall of the casing even though some of the solids may be caught or lodged, between the outer edges of the strips of metal forming the side walls of the slots of the encasing member. Since the outer edges of the elongated strips defining the slots are displaced from the surface of the filter material encased in the metal sheet, fluids may flow around and under any entrapped solid material and thereby gain access to the filter material lying under the entrapped solids. Also, since the encasing member may be made of relatively thin material, fluids flowing on either side of the walls forming adjacent slots readily merge after coming in contact with the small amount of filter material lying under the contacting wall and this filter material is thereby made available for filtration.

The filter body may be formed from a non-woven, but mechanically interlocked, fibrous felt material made from synthetic fibrous material such as linear polyamide fibers knowns as "nylon," acrylic fibers known as "Orlon," polyester fibers known as "Dacron," cellulose acetate, viscose fibers, and the like. Monofilament staple fibers are preferred and viscose fibers have proved particularly advantageous. Preferably, the filter body is composed of a stack, or pile, of ring-like discs having central apertures which are held in alignment by the casing of the cartridge. The expression "ring-like disc" is used here to include materials which are generally cylindrical, elliptical, rectangular, or of other shapes having a central aperture. The central aperture of the filter body is advantageously provided with a perforated, or foraminous, tube core which is preferably shorter than the free length of the stack of filter material. The filter body rings may have a plurality of ring-like discs having circumferential recesses, or convolutions, which form a corrugated, circumferential surface, the discs being positioned upon one another so that the convolutions are oriented in a random manner with the recesses of adjacent discs offset relative to one another.

It has been found, that as a result of the use of mechanically interlocked fibers in the felted ring-like members, there will be more depthwise spring, or resilience, in the assembled filter cartridge than in any other known forms of textile filter cartridge construction. This characteristic provides for greater lateral permeability than is present in the usual filter cartridge and permits ready insertion of the cartridge in conventional filters.

"Mechanicaliy interlocked felt" is used herein in a known manner to mean interlocking the fibers of the carded batt by needling, or other similar mechanical processes, in which the fibers are mechanically carried depthwise through the batt from which felt is made. A batt, which can be referred to as a "carded batt," is prepared on a textile carding machine, conventionally used in the manufacture of felt, whereby a plurality of layers of fibers are provided. In the usual manner of making the mechanically interlocked felt, a plurality of barbed needles are arranged and operated so as to penetrate the thickness of the felted batt in such a manner as to cause fibers to move in a depthwise direction, or across, the layers of fibers of the batt. As the needles are withdrawn, the fibers will remain in their depthwise position where they have been carried so as to produce a mechanically interlocked felt. If desired, both sides of the batt can be subjected to the needling treatment a plurality of times.

Synthetic fibers are available in a wide range of accurately sized diameters or deniers, not obtainable from natural fibers. By a proper selection of felt made from synthetic fibers of a predetermined size, particularly fibers in the form of monofilaments, the filter body can be formed with uniform physical properties so as to control accurately the size of the pores in the filter in a predetermined manner so that particles of a desired known size can be filtered out of fluid media. Also, due to the uniform structure and density of the filter body made from synthetic fibers, it has been found that such bodies have very high solids capacity and a very low pressure differential along the path of flow of fluids passing through the filter.

Other objects, advantages, and features of the invention will be further understood from the following descriptions and drawings which are merely exemplary.

In the drawings:

FIG. 1 shows a perspective view of a suitable ring-like disc made from mechanically interlocked non-woven fibrous felt having a corrugated outer circumferential contour and a central aperture for use in forming a layer in the cartridge filter.

FIG. 2 is a side view of a casing for use in combination with an appropriate filter body to form a filter cartridge for a cartridge filter.

FIG. 3 is a view, partially broken, of a filter cartridge having a casing as shown in FIG. 2 and containing a filter body composed of a stack of discs as shown in FIG. 1.

FIG. 4 is a cross-sectional view along line 4—4 of FIG. 3 showing the top of the cartridge with the edges of the casing turned in over the top of the filter body so as to hold the filter elements assembled in the form of a cartridge.

FIG. 5 is a view, partially broken and in section, of a cartridge filter of conventional design with a cartridge, such as shown in FIG. 3, inserted therein.

FIG. 6 is an enlarged fragmentary section taken substantially along the line 6—6 of FIG. 3.

Filter cartridge 10 (FIGS. 3 and 4) is composed of a stack of superimposed ring-like elements 11 of mechanically interlocked felt encased or held in a unitary metal encasing member 12. The encasing member 12 may be provided with a plurality of continuous supporting strips 13 connected by a plurality of metal strips 14 angularly displaced relative to the supporting strips which thereby define a plurality of elongated slots extending between the supporting strips 13. The size of the opening formed by the slots will depend upon the width and the angular displacement of the sides of the slots relative to the continuous metal support and reaches a desired maximum value for a given width, as illustrated, when the sides, or walls, are substantially radially disposed. The stack of filter elements 11 has its side wall surrounded by the side walls of the casing 12 and the stack is held in the casing in an assembled and compressed state by having the top and bottom serrated edges 15 of the casing 12 crimped inwardly.

The ring-like discs 11 are shown with circumferentially spaced recesses, or convolutions, 14A which serve to form a corrugated circumferential surface. Discs 11 are shown assembled with their central apertures vertically aligned but are preferably positioned, as shown, so that the exterior recesses are offset relative to each other. This arrangement serves to provide more surface area than when the convolutions themselves are in exact registry. It will be understood that this particular design has been selected for purposes of illustration and that other types of filter bodies may be used and filter bodies may be composed of stacks of other ring, ring-like discs, or suitably shaped felt material having their fibers mechanically interlocked.

An example of use of the filter cartridge of the present invention is shown in FIG. 5. As illustrated, a filter cartridge is assembled in an appropriate housing to form a conventional cartridge filter indicated generally at 20 and provided with an inlet 26 and an outlet 27 at the top. Such a cartridge filter is especially designed for filtering liquids. The filter cartridge will be held in place by the flanges shown at 21 and will be sealed thereby. The filter body 22 may have the manifold cap, or cover, 23, held in place thereon by the usual cap nut 24 which removably engages stud 25.

The cartridge may be advantageously used with a foraminous tube core 28, such as a foraminous paper or other suitable material, said tube preferably being shorter in length than the stack of ring-like filters constituting the cartridge in its free condition before being inserted in the assembled filter. In this way, the filter cartridge can be inserted in cartridge filters of different lengths by the application of pressure of the filter casing elements to the resilient ring-like discs without the casing elements of the filter impinging upon the core of the filter cartridge.

It will be apparent that a number of the advantages of this invention can be obtained, especially when making cartridge filters of standard size, by using other types of unitary encasing members. For example, an encasing member of a desired shape provided with slots defined by walls properly angularly disposed can be formed from plastic materials.

As stated above, the felt filter body of the cartridges hereof are advantageously made of mechanically interlocked synthetic fibers. It will be understood, however, that various combinations of synthetic fibers may be used and that synthetic fibers may be mixed with a minor amount of natural fibers and yet obtain many of the advantages of using synthetic fibers alone.

It should be apparent that the disclosed details of the construction of the filter cartridge is for illustrative purposes and may be varied without departing from the spirit of the invention, except as defined in the appended claims.

What is claimed is:

1. A cartridge for a cartridge type filter, comprising a body of felt filter medium and a metal enclosure therefor, said enclosure comprising parallel widely spaced strips lying in a single plane between which are located a plurality of closely spaced parallel strips twisted transversely to said widely spaced strips forming an angle to the plane including said widely spaced strips; means on two opposed edges of said widely spaced strips for engaging the ends of said body of felt; and fastening means on the remaining two edges of said enclosure, whereby said enclosure may be wrapped around said felt body and securely fastened thereto.

2. The method of encasing a felt filter medium to provide a cartridge for a cartridge type filter which comprises providing a thin sheet of metal with a plurality of closely spaced parallel slits forming thin parallel strips throughout the area of said sheet of metal; twisting said strips about their longitudinal axes midway of said slits so that together they form a plurality of closely spaced parallel strips disposed at an angle relative to the plane of said sheet metal; serrating the edges of said sheet metal adjacent the ends of said slits; wrapping said sheet metal about a felt body; connecting the abutting edges of said sheet; and crimping said serrated edges into the ends of said felt body.

References Cited in the file of this patent

UNITED STATES PATENTS

| | | |
|---|---|---|
| 2,212,647 | Nugent | Aug. 27, 1940 |
| 2,227,990 | Zelt | Jan. 7, 1941 |
| 2,331,961 | Clark | Oct. 19, 1943 |
| 2,396,712 | Luttge | Mar. 19, 1946 |
| 2,407,046 | Vokes | Sept. 3, 1946 |
| 2,426,405 | McDermott | Aug. 26, 1947 |
| 2,522,975 | Voorhees | Sept. 19, 1950 |
| 2,550,070 | La Brecque | Apr. 24, 1951 |
| 2,728,458 | Schultz | Dec. 27, 1955 |

OTHER REFERENCES

"DuPont Textile Fibers Technical Information," Bulletin X-64, January 1957, 10 pages (copy in Div. 67).

UNITED STATES PATENT OFFICE

CERTIFICATE OF CORRECTION

Patent No. 3,050,191 August 21, 1962

Thomas J. Gillick, Jr., et al.

It is hereby certified that error appears in the above numbered patent requiring correction and that the said Letters Patent should read as corrected below.

Column 1, line 13, for "used" read -- use --; line 27, for "imparied" read -- impaired --; column 4, line 8, before "filter", first occurrence, insert -- felt --.

Signed and sealed this 29th day of January 1963.

(SEAL)
Attest:

ERNEST W. SWIDER
Attesting Officer

DAVID L. LADD
Commissioner of Patents